United States Patent [19]

Lipton et al.

[11] Patent Number: 5,142,357
[45] Date of Patent: Aug. 25, 1992

[54] STEREOSCOPIC VIDEO CAMERA WITH IMAGE SENSORS HAVING VARIABLE EFFECTIVE POSITION

[75] Inventors: Lenny Lipton, Greenbrae; Lawrence D. Meyer, Mill Valley, both of Calif.

[73] Assignee: Stereographics Corp., San Rafael, Calif.

[21] Appl. No.: 697,893

[22] Filed: May 9, 1991

Related U.S. Application Data

[63] Continuation-in-part of Ser. No. 595,595, Oct. 11, 1990, Pat. No. 5,063,441.

[51] Int. Cl.⁵ .............................................. H04N 13/00
[52] U.S. Cl. ........................................ 358/88; 358/91
[58] Field of Search .................. 358/88, 91, 92, 3, 222

[56] References Cited

U.S. PATENT DOCUMENTS

| | | | |
|---|---|---|---|
| 4,418,993 | 12/1983 | Lipton | 352/57 |
| 4,523,226 | 6/1985 | Lipton et al. | 358/88 |
| 4,562,463 | 12/1985 | Lipton | 358/88 |
| 4,583,117 | 4/1986 | Lipton et al. | 358/92 |
| 4,734,756 | 3/1988 | Butterfield et al. | 358/3 |
| 4,751,570 | 6/1988 | Robinson | 358/88 |
| 4,792,850 | 12/1988 | Lipton et al. | 358/92 |
| 4,879,596 | 11/1989 | Miura et al. | 358/88 |
| 4,884,876 | 12/1989 | Lipton et al. | 350/347 |
| 4,926,257 | 5/1990 | Miyazaki | 358/98 |
| 4,956,705 | 9/1990 | Wright | 358/88 |
| 5,003,385 | 3/1991 | Sudo | 358/3 X |

OTHER PUBLICATIONS

J. Baker, "Generating Images for a Time-Multiplexed Stereoscopic Computer Graphics System", *Proceedings of the SPIE-ISOE*, vol. 761, 1987, pp. 1–9.

R. Spottiswoode, N. L. Spottiswoode & C. Smith, "Basic Principles of the Three-Dimensional Film", *Journal of the SMPTE*, vol. 59, Oct. 1952, pp. 249–285 and 639–641.

K. Uomori, A. Morimura, H. Ishii, T. Sakaguchi, & Y. Kitamura, "Automatic Image Stabilizing System by Full-Digital Signal Processing", *IEEE Transactions on Consumer Electronics*, vol. 36, No. 3, Aug. 1990, pp. 510–519.

T. Kinugasa, N. Yamamoto, H. Komatsu, S. Takase, & T. Imaide, "Electronic Image Stabilizer for Video Camera Use", *IEEE Transactions on Consumer Electronics*, vol. 36, No. 3, Aug. 1990, pp. 520–525.

L. Lipton, *Foundatoins of the Stereoscopic Cinema*, published by Van Nostrand Reinhold, copyright 1982, pp. 128–147.

*Primary Examiner*—Victor R. Kostak
*Attorney, Agent, or Firm*—Limbach & Limbach

[57] ABSTRACT

An electronic stereoscopic video camera for capture and playback of still or moving images. The camera of the invention employs a signal processing means to process the video output of left and right image sensors in order to locate the positions of left and right images in the camera's left and right image fields, respectively. As a result of comparison of the left and right image locations, control signals are generated for adjusting the effective position of one or both of the sensors in relation to a set of fixedly mounted camera lenses. The invention permits rapid and accurate control of a variety of video camera parameters by employing a self-correcting closed loop servo means in which the unmodified output of the left and right image sensors of a camera serves as feedback for generating control signals. The control signals are employed to adjust the effective position of left and right camera sensors in relation to fixedly mounted camera lenses, to control the convergence or zero parallax setting of the camera, or camera recentration.

19 Claims, 10 Drawing Sheets

FIG. 4A
FIG. 4B
FIG. 4C
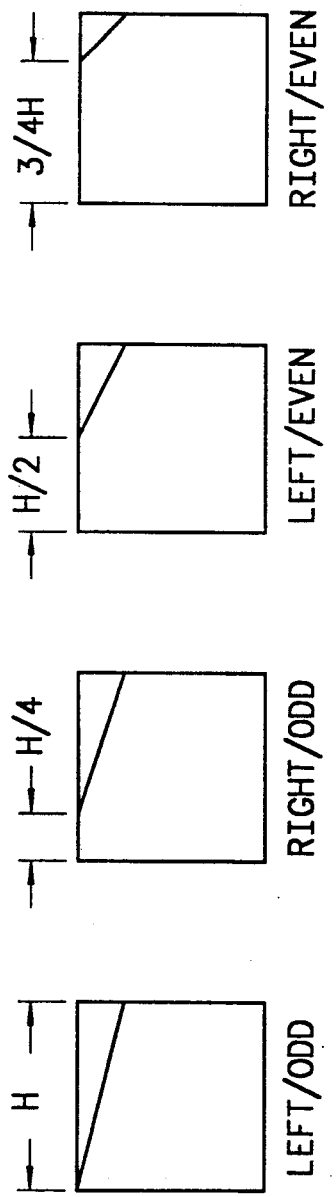
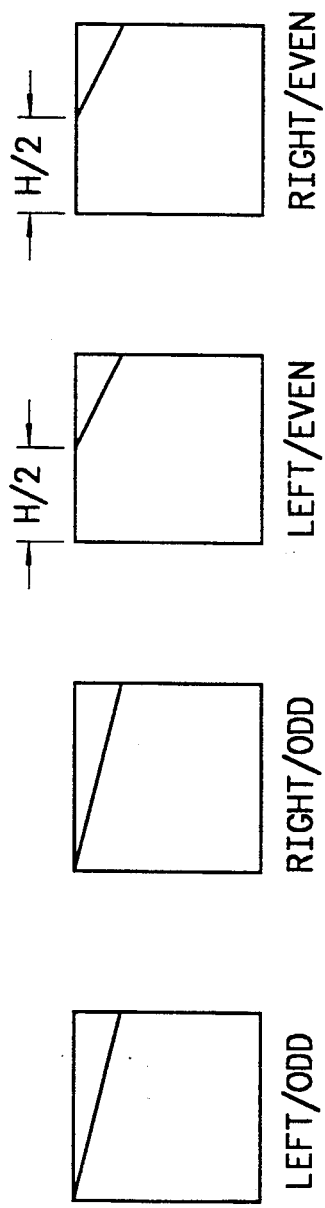
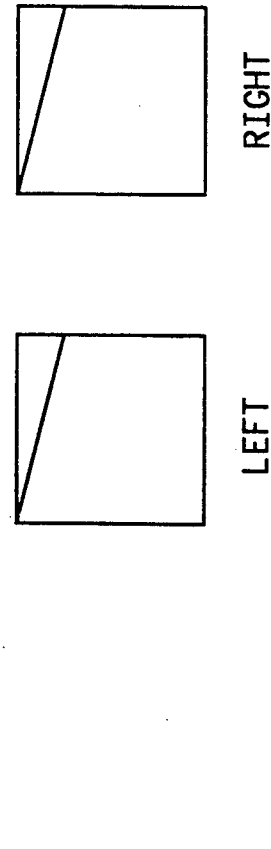

STEREOSCOPIC VIDEO CAMERA WITH IMAGE SENSORS HAVING VARIABLE EFFECTIVE POSITION

CROSS-REFERENCE TO RELATED APPLICATION

This application is a continuation-in-part of U.S. Pat. Application Ser. No. 07/595,595, filed Oct. 11, 1990, and entitled "Stereoscopic Video Camera with Image Sensors Having Variable Effective Position," which issued as U.S. Pat. No. 5,063,441 on Nov. 5, 1991.

FIELD OF THE INVENTION

The invention pertains to stereoscopic video cameras for the videography of still or moving images. More particularly, the invention is a stereoscopic video camera for the videography of still or moving images, which includes signal processing circuitry for locating and controlling the position of images in the camera's left and right image fields.

BACKGROUND OF THE INVENTION

Prior electro-stereoscopic video cameras described in the literature are of the type discussed by U.S. Pat. No. 4,583,117, to Lipton, et al., or the type described by U.S. Pat. No. 4,879,596, to Miura, et al. In the former case, two individual video camera heads (consisting of lenses and image sensors) are used, mounted on a base, to provide the two perspective viewpoints. In the latter disclosure, two video cameras are used, but packaged in a more pleasing manner to provide the appearance of an integral camera. In both cases, two sets of lenses and image sensors are employed, and in both cases, the image is displayed field-sequentially so that left and right perspective viewpoints are alternated. When viewed through shuttering devices each eye sees only its appropriate perspective viewpoint, and the result is an image perceived with the depth cue stereopsis.

Electronic stereoscopic video cameras have been sold for applications such as teleoperations using the field-sequential approach, following the art taught in U.S. Pat. Nos. 4,583,117 and 4,523,226 [both Lipton et al.] and for amateur applications the above referenced U.S. Pat. No. 4,879,596 [Miura et al.] has been recommended. In addition, systems using the technology described in U.S. Pat. No. 4,562,463 [Lipton] have been demonstrated at various trade shows.

In the case of U.S. Pat. No. 4,523,226 and the related U.S. Pat. No. 4,583,117, flickerless images result, but each eye will see an image with half the number of video lines which can be displayed in the planar image using the same bandwidth. The restoration of the full complement of lines per eye is achieved with image storage, using devices called scan converters or line doublers available from JVC, Sony, Macrodata, and others.

The technology described in U.S. Pat. No. 4,562,463 can produce a flickerless effect while maintaining the full complement of lines for each eye by storing the scanned video fields and playing back each field twice, at twice the vertical rate at which it was read.

Both of these means are upwardly compatible with regard to the existing video infrastructure. That is to say, for NTSC, PAL, or SECAM video, the image may be transmitted or stored using unmodified hardware.

A number of proposals have been made with regard to selection devices employed for the display of such images. Two such proposals by Lipton et al., in U.S. Pat. Nos. 4,792,850 and 4,884,876, describe respectively means using passive and active eyewear. Products using the art described in these two patents have been manufactured by StereoGraphics Corporation, and are in use by persons in fields such as molecular modeling, aerial mapping and for various other applications. The technique described in U.S. Pat. No. 4,523,226, mentioned above in the context of video systems, has proved to be a cost effective means for formatting flickerless computer generated images for stereoscopic display from unmodified computer hardware.

In the past few years, a number of people have begun to use electronic stereoscopic displays for computer graphics. On the other hand, the field of stereoscopic television and video cameras has lagged behind, in part because there are no integral camera units which can meet the performance standards set in the field of electro-stereoscopy for computer graphics.

The only integral stereoscopic video camera is one which was produced under U.S. Pat. No. 4,879,596 to Miura et al. ("Miura"). However, the convergence technique described in Miura will create images that have geometric distortion. FIG. 1 (taken from Miura) shows the arrangement used for converging the lenses on a subject which is to appear in the plane of the display screen. Such a rotation of the lenses and image sensors must always result in geometric distortion as illustrated in FIGS. 2a and 2b. It has been understood in the literature of stereoscopy that such rotation will create what is sometimes called "keystoning". This is a geometric distortion with a resultant misalignment of corresponding points in the vertical direction, producing undesirable vertical parallax.

Rotation of the rectangle shown in FIG. 2a about the dotted line representing a vertical axis will result in an apparent change in the length of the vertical sides AC and BD, resulting in a longer side $A^1C^1$ and a shorter side $B^1D^1$, as shown in FIG. 2b. This rotation is the geometric equivalent of that which is produced by the rotation of the camera heads shown in FIG. 1. When viewing such an image stereoscopically the eyes will be called upon to fuse corresponding image points with vertical parallax. The eyes are not called upon to do this when looking at objects in the visual world and the effort of fusing images with vertical parallax uses the muscles of the eyes in an unusual manner. Most people will experience this as a source of discomfort.

When the video camera heads, lenses and sensors, are rotated as called for by Miura, this is the result, and the geometric distortion is especially serious for objects which are close to the lenses or if wide angle optics are employed. This phenomenon is described in a paper by John Baker ["Generating Images for a Time-Multiplexed Stereoscopic Computer Graphics Systems," Proceedings of the SPIE-ISOE, Vol. 761, 1987]. Baker discusses the cure for the distortion, namely the use of cameras with parallel lens axes, and accomplishing convergence through horizontal shifting of left and right image fields. This technique is also given in Lipton's U.S. Pat. No. 4,523,226.

The means set forth herein for preventing the occurrence of geometric distortion in video camera produced images may also be used to produce superior results when applied to the elimination of the generation of spurious parallax due to recentration of zoom lenses, described by Lipton in U.S. Pat. No. 4,418,993.

In some conventional rangefinding techniques, signals from a pair of laterally separated radiation sensors are compared electronically to compute the distance to a sensed object in a direction perpendicular to the plane of the sensors.

A similar technique is described in U.S. Pat. No. 4,751,570 to Robinson, for controlling the convergence (and other parameters) of a stereoscopic video camera for the purpose of improving image quality. In the Robinson system, convergence is controlled by rotating the left and right camera heads. Robinson suggests that range information can be provided by transmitting laser or ultrasound radiation to an object, and detecting and processing reflections of the radiation in a programmed microcomputer to generate control signals for setting such camera parameters as the relative rotational orientation of the camera heads.

However until the present invention, no stereoscopic video camera had been developed which generated control signals for controlling camera convergence, zero parallax setting, or recentration, by processing signals representing the camera's normal, unmodified left and right image fields to generate control signals for adjusting the effective position of the left and right sensors in relation to fixedly mounted camera lenses. The invention eliminates the need to transmit a special radiation signal to the object being imaged and to detect reflections of such special radiation signal.

SUMMARY OF THE INVENTION

This invention is an integral and compact electronic stereoscopic camera for generating either moving or still images. The camera has means for controlling convergence, which may be set either manually or automatically, by methods which do not induce the geometric distortion described above. The camera can implement recentration of zoom optics, or recentration associated with focusing as described in Lipton's U.S. Pat. No. 4,418,993. The preferred means for achieving convergence control or recentration tracking is by shifting the image sensors, or active portions of the sensors, with respect to lenses which remain physically fixed in place with their lens axes perpendicular to the plane of the image sensors.

The invention employs a signal processing means to process the video output of left and right image sensors of the camera, in order to locate the position of left and right images in the camera's left and right image fields, respectively. As a result of comparison of the left and right image locations, control signals are generated for adjusting the effective position of one or both of the sensors in relation to a set of fixedly mounted camera lenses.

The invention permits rapid and accurate control of a variety of video camera parameters by employing a self-correcting closed loop servo means in which the unmodified output of the left and right image sensors of a camera serves as feedback for generating control signals. The control signals are then used to adjust the effective position of the left and right sensors in relation to fixedly mounted camera lenses.

BRIEF DESCRIPTION OF THE DRAWINGS

FIGS. 4a, 4b, and 4c are line scanning patterns for storage and playback of a stereoscopic picture.

Each of FIGS. 13 and 14 is a diagram representing uncorrected left and right stereoscopic video camera images, as they would appear displayed on a monitor.

DESCRIPTION OF THE PREFERRED EMBODIMENTS

Figure 1:
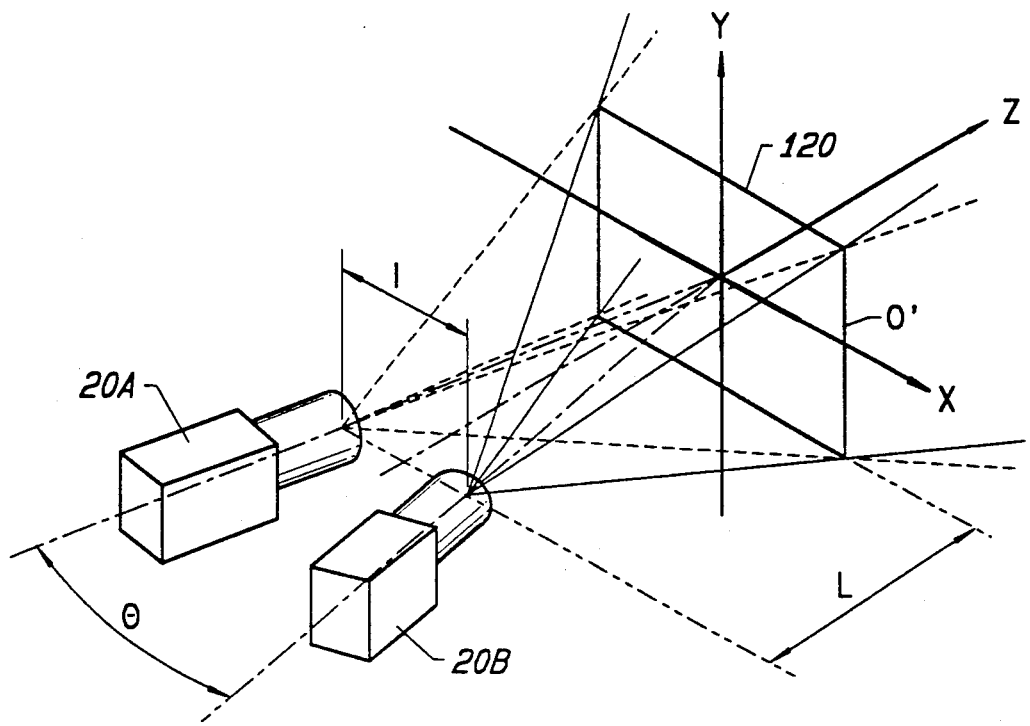
FIG. 1 is a prior art system, employing converging stereoscopic video camera lenses.

FIG. 1 is a prior art drawing taken from Miura et al., U.S. Pat. No. 4,879,596. In FIG. 1, camera heads 20a and 20b are rotated through angle theta to achieve convergence. Each camera head consists of a lens which forms an image on a light sensitive sensor such as a CCD array. Head 20a provides the left perspective viewpoint and head 20b the right perspective viewpoint. The camera lenses are separated by distance "1" and the distance from the cameras, or their lenses, to the plane of convergence 120, in the visual world is given by distance L. The two camera heads' fields of view coincide on rectangular area 120, with the axes of the two lenses crossing at the intersection of lines X and Y.

An object intersecting plane 120 will be imaged to appear in the plane of the display screen.

The reason for this is given in some detail in Lipton, *Foundations of the Stereoscopic Cinema*, Van Nostrand Reinhold, 1982, and in Spottiswoode and Spottiswoode, *Stereoscopic Transmission*, University California Press, 1953. Lipton calls this type of projection or display system a crossed lens axis system, and Spottiswoode and Spottiswoode call it a zero center line system. In such a system images of objects which have zero parallax—in other words, corresponding image points are aligned on top of each other—will appear to be in the plane of the display screen. Objects which have crossed, or negative, parallax will appear to be in front of the display screen, and objects which have uncrossed, or positive parallax, will appear to be within or behind the display screen. It is therefore of fundamental importance when creating stereoscopic videographed images to control the plane of convergence at the time of photography.

Figures 2A, 2B:
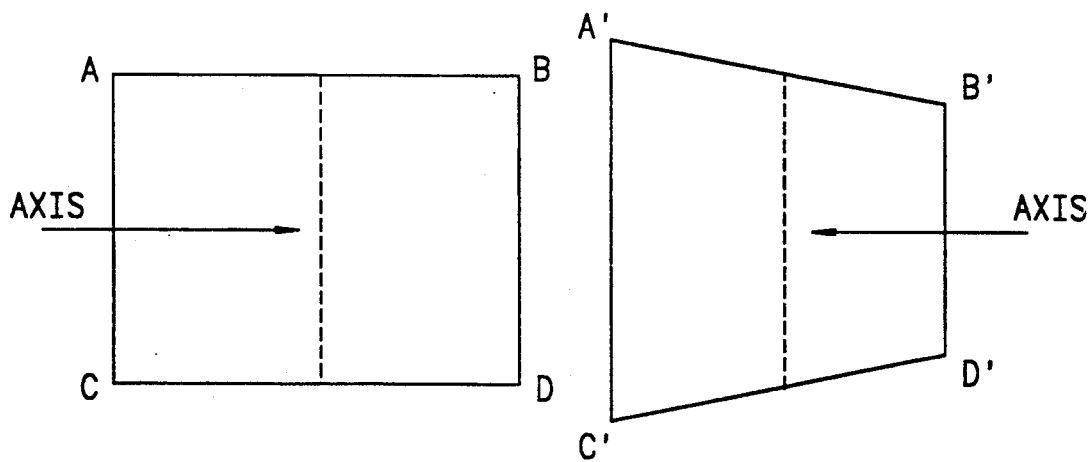
FIGS. 2a and 2b show the geometric distortion that results from the method of rotation of lenses to produce convergence.

While the need for locating the volumetric extent or location of an image with respect to the surface of the display screen is an important concern, we can see from FIGS. 2a and 2b, as discussed above, that the rotation of the camera heads 20a and 20b, will produce geometric distortion. This geometric distortion or keystoning will produce vertical parallax for the image points shown in Rectangle A,B,C,D. Vertical parallax, as is well known, is not desirable in stereoscopic displays because the eye muscles will need to rotate in an unaccustomed vertical direction to fuse corresponding image points A and $A^1$, B and $B^1$, and so forth. For just about any conceivable object, except for one with bilateral symmetry, such as a sphere or a cylinder, geometric distortion will result from the rotation of the lens axes as shown in FIG. 1 as taught by Miura et al.

Figure 5A:
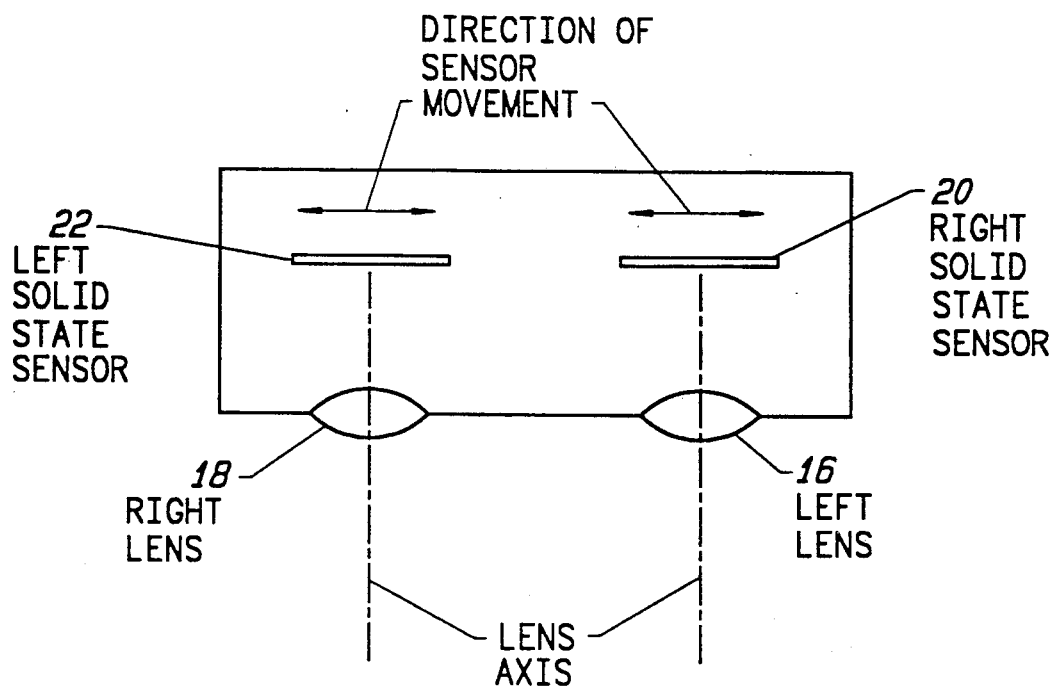
FIGS. 5a, 5b, 5c, and 5d are the layouts of integral electro-stereoscopic cameras which embody the invention, indicating the direction for horizontal shifting of the sensors for convergence control, and means for moving the sensors.

The cure for the problem is to use cameras whose lens axes are parallel, and remain parallel, as shown in FIG. 5a. If the lens axes remain parallel, then convergence can be effected through horizontal shifting of either one or both of the image sensors.

A better term to use than convergence in this case might be zero parallax setting (ZPS), since we are seeking to produce zero parallax for selected image points without resultant geometric distortion to any of the corresponding image points.

There are several ways in which such horizontal shifting can be achieved. In one case, the lens or lens elements can be shifted in the horizontal direction so that the image will also be shifted in the horizontal direction. This is a technique which is well known to photographers who use view cameras or perspective control lenses. However, because of the mass of the lens, such horizontal movement of the lens can involve bulky mechanical controls and can be costly to implement. In addition, if it is desired to *follow convergence*, to maintain the image at the plane of the screen even if its distance to the camera changes, then smooth and continuous convergence control is desired. In such a case electric motors or other electromagnetic/mechanical devices, well known in the art, must move the entire lens or elements of the lens. As a more desirable alternative, we will describe means for moving the image sensor without recourse to moving the more massive and difficult to move lens or section of a lens.

Figure 3:
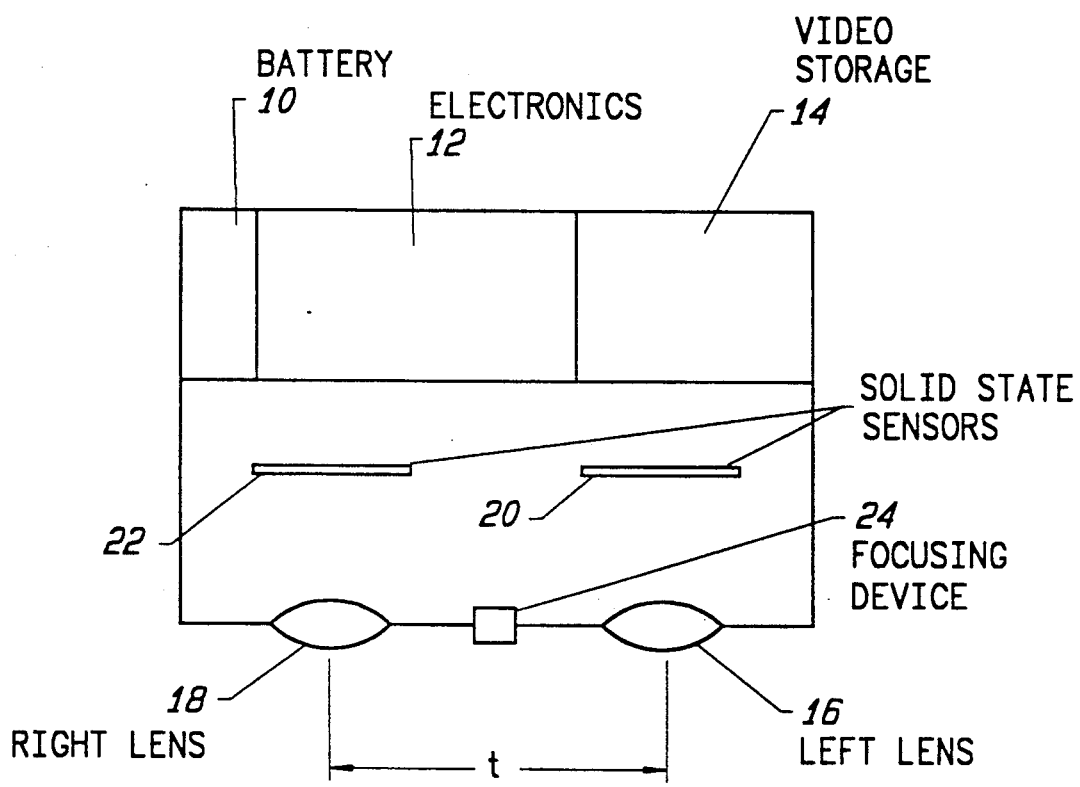
FIG. 3 is a schematic layout of a basic electrostereoscopic video camera of the invention.
Figure 5B:
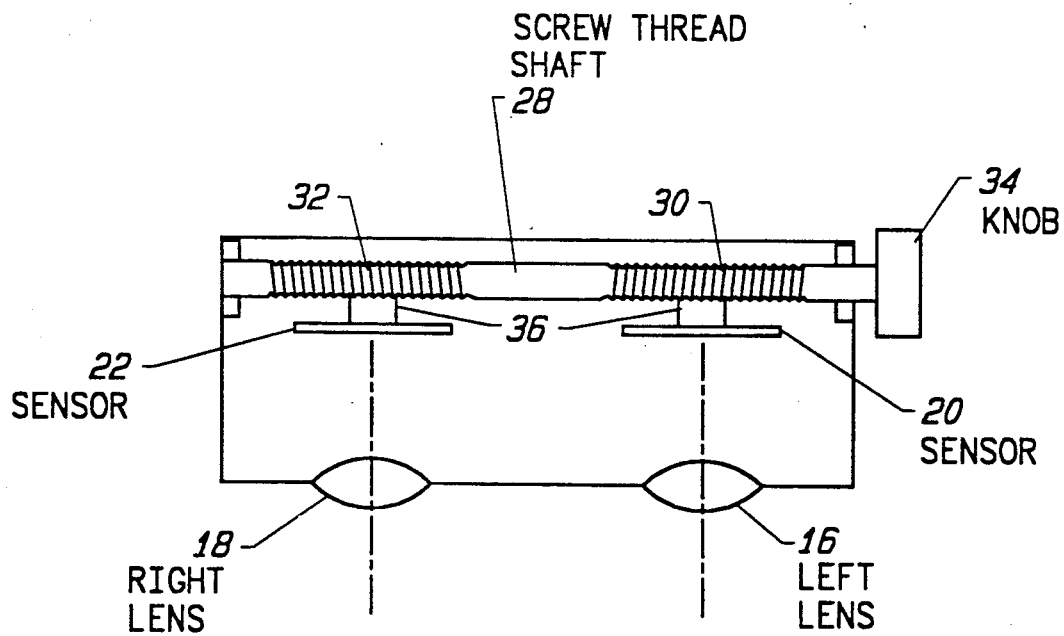

With regard to FIG. 5b, we can see that one means for controlling the ZPS is to horizontally shift the image surfaces themselves. Before we discuss this in any detail let us examine FIG. 3. FIG. 3 is an overall schematic of the basic layout of an electronic stereoscopic still or moving image video camera. We see the various functional assemblies or modules are laid out in a block diagram form. Typically there needs to be a battery 10, although the camera might just as well be powered from some external power supply. There will be a need for electronics controls 12 of various kinds, such as those associated with the image forming sensor, enabling it to output a video signal. There will also be a need for means 14 for storing the image, in particular in the case of an electronic still camera. Storage of video fields or frames may also be required if the camera is a moving image video camera, which combines the functions of a video tape recorder with image capture functions.

We also see that left and right lenses 16 and 18 are separated by some inter-axial separation t, and each lens forms an image on its respective solid state image sensor (20 or 22). Without loss of generality, it would also be possible to use cathode ray tube imaging devices. However, in all likelihood, most, if not all, future video cameras, either still or moving image devices, will incorporate solid state sensors of any one of various types, such as charge coupled devices (CCDs) or other types of solid state mosaic devices. Also, let us point out that although a single image surface is shown, useful for monochrome, color video may be achieved if said image surface is made up of a mosaic covered with colored filters to produce a desired color image, or made up of two or more image surfaces which are placed in an optical system employing semi-silvered mirrors or beam-splitting prisms as a means to record appropriate portions of the visible spectrum.

We can also see (in FIGS. 3 and 5c) that an automatic focusing device 24 has been incorporated into the camera. Many modern video cameras, especially those for the amateur market, incorporate automatic focusing devices. These are of two types—active and passive devices. Active devices often emit an infrared or ultrasonic signal, which is reflected by an object in the visual world, and is then sensed by a device located on the camera to produce distance information. The other approach is to use a passive system which typically incorporates some means to opto-electronically evaluate the sharpness of the image. The distance information acquired by either type of device is used to control the focusing of the lens, usually in the form of a closed-loop servo system. Automatic focusing has become an important and useful feature, and is generally achieved by motor control of the focusing section of the zoom lens, or, in the case of simpler cameras, by moving the entire lens closer to or further away from the sensor.

With reference now again to FIG. 5a, we can see that the movement of the solid state sensor in a direction perpendicular to its axis (the "horizontal" direction in FIG. 5a) could be achieved by use of mechanical or electromechanical means, such as motors, solenoids, or other types of devices capable of moving the sensor in the horizontal direction. Such means are well known in the art. We have recognized that in a video system of this kind (in contrast with a film system), the sensors themselves may be readily moved, providing an opportunity to elegantly control the ZPS.

It is possible that such control could be manually set so that the zero parallax condition could be achieved, as shown in FIG. 5b. This horizontal shifting of the sensors, which could involve one or both of the sensors, can be achieved by simple mechanical means as shown in FIG. 5b. Here, a rod 28 with screw threads 30 and 32 cut in opposite directions, on each half of the rod, forms part of a dual worm gear device. The screw threads move the left and right image sensors 20 and 22 in equal and opposite directions when knob 34 is turned. A worm gear device 36 is used to move each sensor. The sensor or sensors continue in their electrical interface by means of flexible connectors or cables. The setting can be achieved by means of a scale, marked in feet or meters, to enable the videographer to control the ZPS. It will be obvious to a person of ordinary mechanical skill that this dual worm gear approach is only one of many which might be applied here, and we do not mean to limit ourselves to this one means.

Figure 5C:
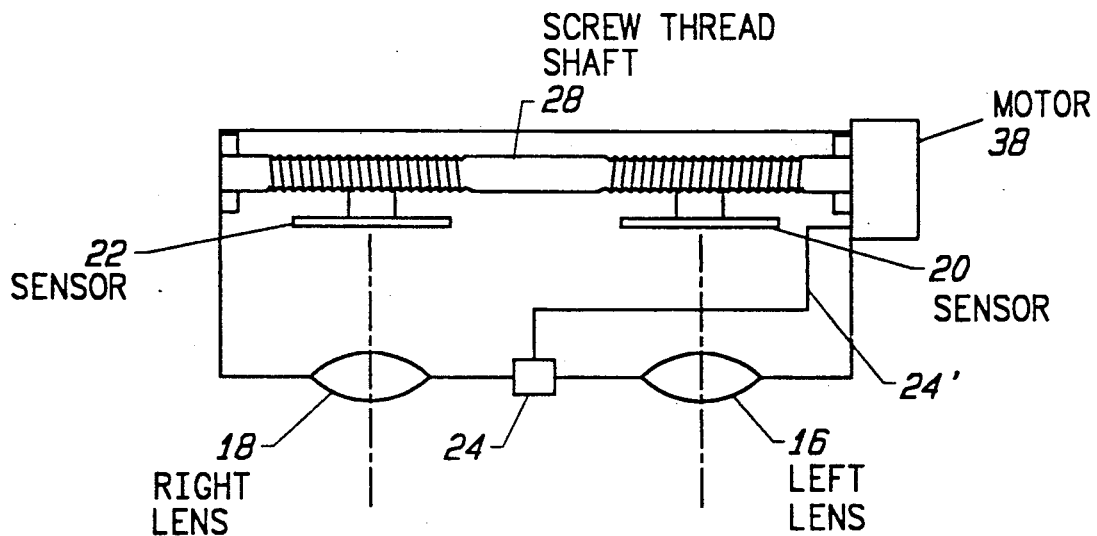

An alternative is shown in FIG. 5c in which a motor 38 is coupled to the device shown in FIG. 5b, and used to control the sensors' horizontal position. Motor control would allow for the automatic tracking or following of convergence if it were controlled by a control signal from auto focus sensor 24 (connected by line 24' to motor 38). By such a means the object which is kept in focus by an automatic focus means could also be kept in the plane of the display screen. This, or some variation of the idea, might be acceptable for the great majority of subjects.

The concept of interlocking focusing and convergence is discussed in the literature and Spottiswoode, Spottiswoode and Smith (Journal of the SMPTE, Oct. 1952, Vol. 59) cite the work of Dewhurst and Bodrossy.

It is possible to process the control signal from auto focus sensor 24 in any of several different ways. The user may select from among these ways to cause the zero parallax condition for images automatically to track at the plane of sharp focus, or in front of or behind the plane of sharp focus, so that the image of the object of interest appears at the plane of the screen, behind or in front of the plane of the screen. We contemplate that such a user selectable option could be built into an autofocusing/ZPS system.

Figure 5D:
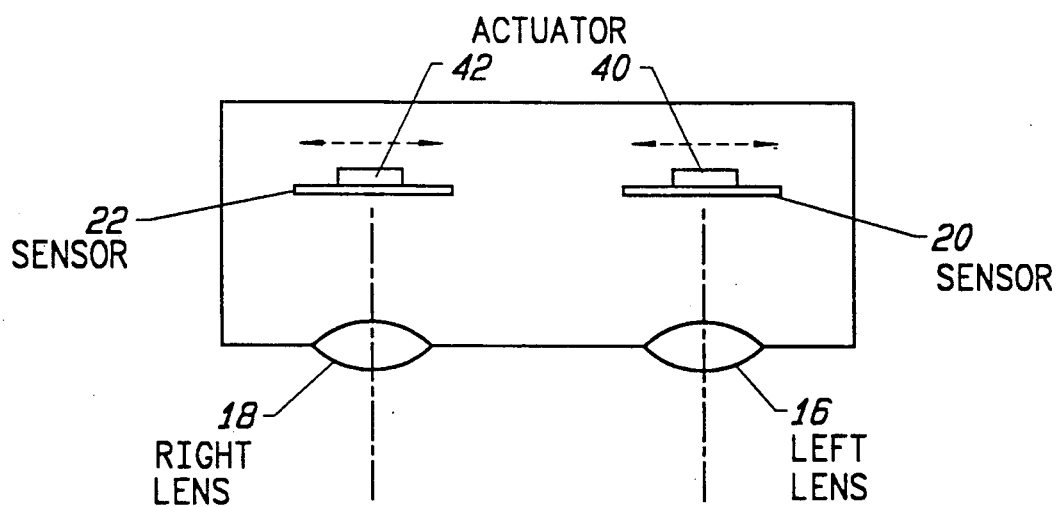

FIG. 5d is a variation on the concept described with the aid of FIG. 5c and differs in that it uses two independent actuator means (40 and 42) to move sensors 20 and 22 independently. There are various well known electromechanical means to horizontally move such sensors. If cost of manufacture was an overriding consideration then it would be acceptable to provide only actuator means 40 or actuator means 42, to move only one of sensors 20 and 22, but as we shall see below, superior optical results may well be obtained by moving both sensors. If two sensors are employed it is desirable to move both in equal and opposite directions.

Figure 5E:
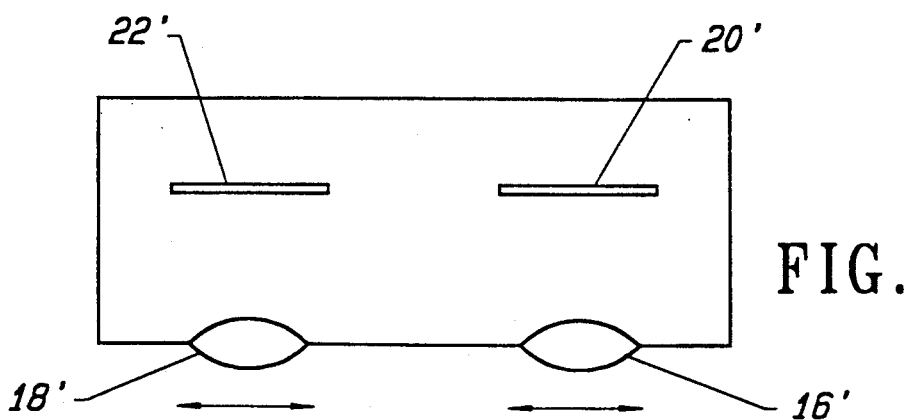
FIG. 5e is the layout of an alternative embodiment of the inventive integral electrostereoscopic camera, indicating the direction for horizontal shifting of the lenses relative to the sensors.

With reference to FIG. 5e, in an alternative embodiment of the invention, left and right sensors 22' and 20' are fixedly mounted (with substantially parallel axes), and either or both of left and right lenses 18' and 16' are mounted (with substantially parallel axes) for movement in a direction (the "horizontal" direction shown by the arrows in FIG. 5e) perpendicular to their axes by use of mechanical or electromechanical means, such as motors, solenoids, or other types of devices which could move the lenses in the horizontal direction. Such means are well known in the art.

Figure 6:
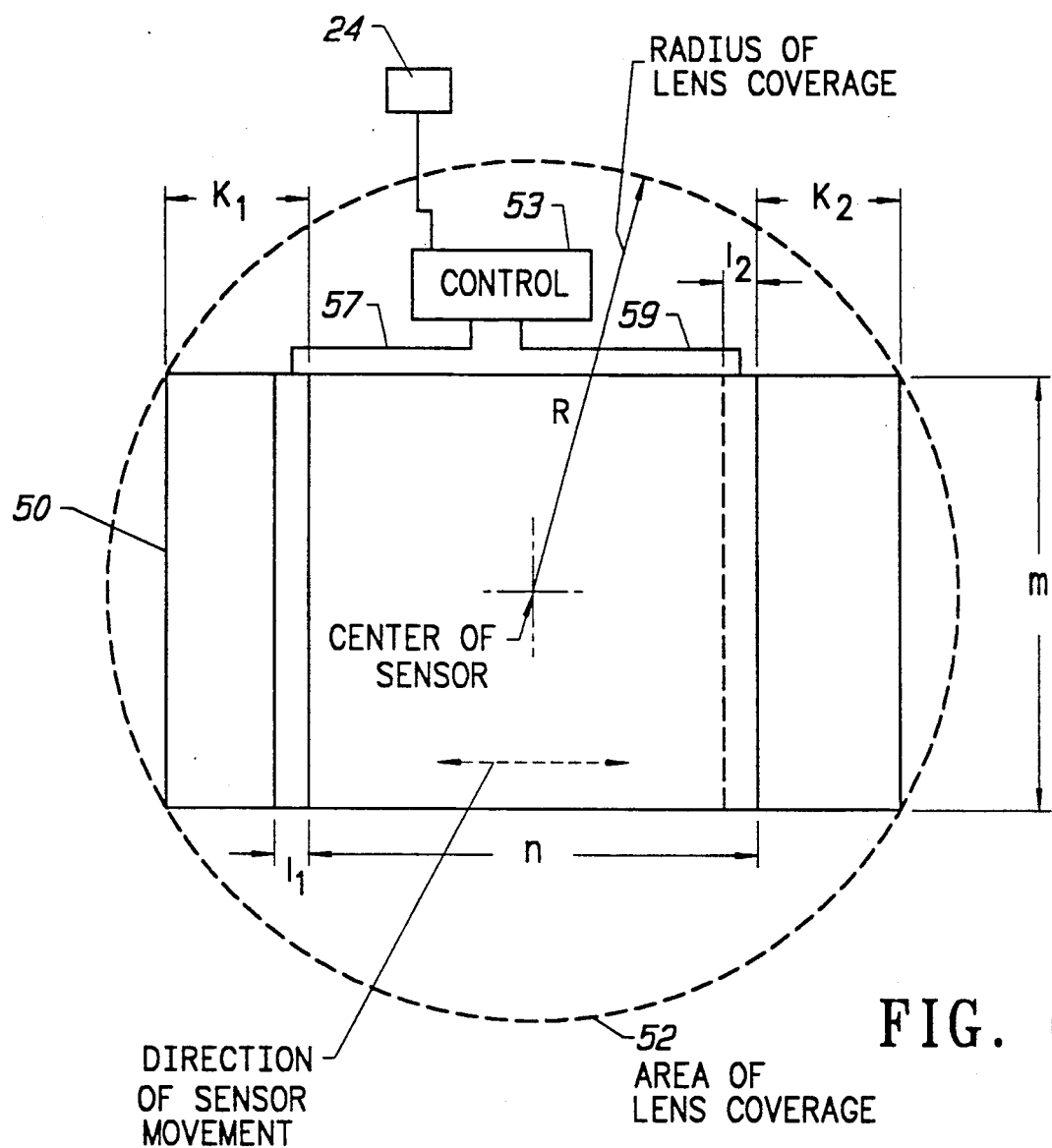
FIG. 6 is a diagrammatic representation of a solid state sensor with variably addressed columns to maintain the aspect ratio of the image while effectively shifting the image center to control convergence.

FIG. 6 is a drawing of a sensor 50 which is located behind a lens which remains in a fixed relationship to the sensor, and whose axis remains perpendicular to the plane of the sensor surface. Sensor 50 may be either the left or right sensor. In FIG. 6 we see that the radius of lens coverage R, is larger than the imaging area of nm. Dimensions n and m are the present standard video aspect ratio, and the value of n/m is 1.3:1. This aspect ratio could be any desired value, without loss of generality, such as 2:1 which has been advocated for certain high definition television systems. The area within the radius of lens coverage R, is defined as the circular area 52, which contains well corrected image points which do not suffer from excessive vignetting or aberration. It is well known in the art of photography, especially with regard to the use of view cameras which need to employ tilts and swings and lateral shifts of lenses, that it is important to employ lenses with good coverage of larger than the film format so that tilts, swing, lateral shifts, and so forth can be achieved having good photographic quality across the entire surface of the film. The same concerns apply here to the usable image area or lens coverage and the imaging surface since that surface will be moved with respect to the lens axis. It is assumed that the center of the full imaging array shown in FIG. 6 will be intersected by the lens axis.

P, the total number pixels of the video sensor is given by the product of $n_p m_p$, which is the product of the total number of pixels in the columns and rows. Additional pixel areas $k_1 m$, and $k_2 m$, on either ends of area nm are provided. These additional areas make the overall dimensions of the sensor equal to $2km + nm$. It is possible to effectively horizontally shift the sensor by electronically scanning selected columns of pixels, by selectively enabling and disabling individual columns of pixels using control circuit 53. For example, pixel columns are located in areas $1_1 m$ and $1_2 m$. $1_2 m$ lies within area nm, and $1_1 m$ lies outside of area nm. When sensor control circuit 53 sends appropriate signals though lines 57 and 59 to switch $1_1 m$ on and $1_2 m$ off (or to switch $1_1 m$ off and $1_2 m$ on), this creates the effective lateral shifting of image sensor 50 and repositions the location of the center of the imaging surface, given a fixed intersection of the lens axis. In fact, any number of columns from one end of the array can be turned on using control circuit 53, and the same number of columns at the other end of the array can be turned off, to laterally shift the active image surface within the bounds of horizontal dimension $2k + n$. We note that the aspect ratio n/m will remain constant if as many columns are added as are subtracted in the process described.

The essence, then, of the method is to switch on and off appropriate columns located at opposite horizontal ends of the sensor array or matrix, as shown in the drawing and as described in the text to, in effect, horizontally shift the image sensor to provide a new center for the image field. By such means the ZPS may be achieved for the desired objects.

Control circuit 53 may operate under the control of a control signal from auto focus means 24, in the same way that motor 38 (of FIG. 5c) may operate under control of a control signal from auto focus means 24. By such a means the object which is kept in focus by automatic focus means 24 may also be kept in the plane of the display screen. More generally, control circuit 53 may be operated in any of a variety of modes, including for example a mode in which it processes the control signal from auto focus means 24 to maintain the camera's zero parallax point coincident with the focal point, a mode in which it processes the control signal from auto focus means 24 to maintain the zero parallax point in front of the focal point, and a mode in which it processes the control signal from auto focus means 24 to maintain the zero parallax point in back of the focal point.

Figure 10:
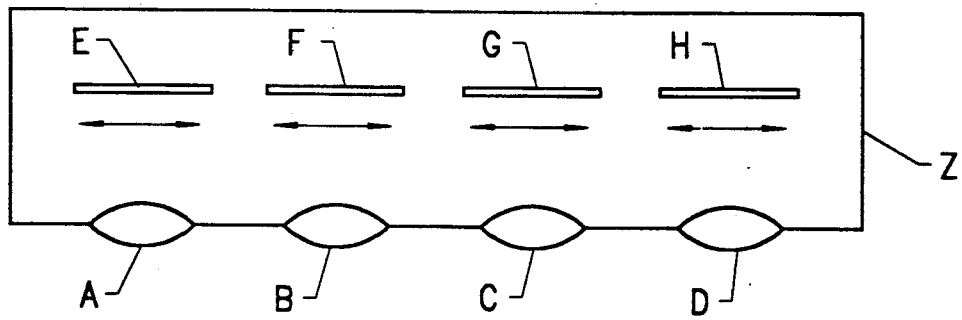
FIG. 10 is a drawing of a multiple lens stereoscopic video camera for capturing images to be presented as interdigitated parallax stereograms.
Figure 11:
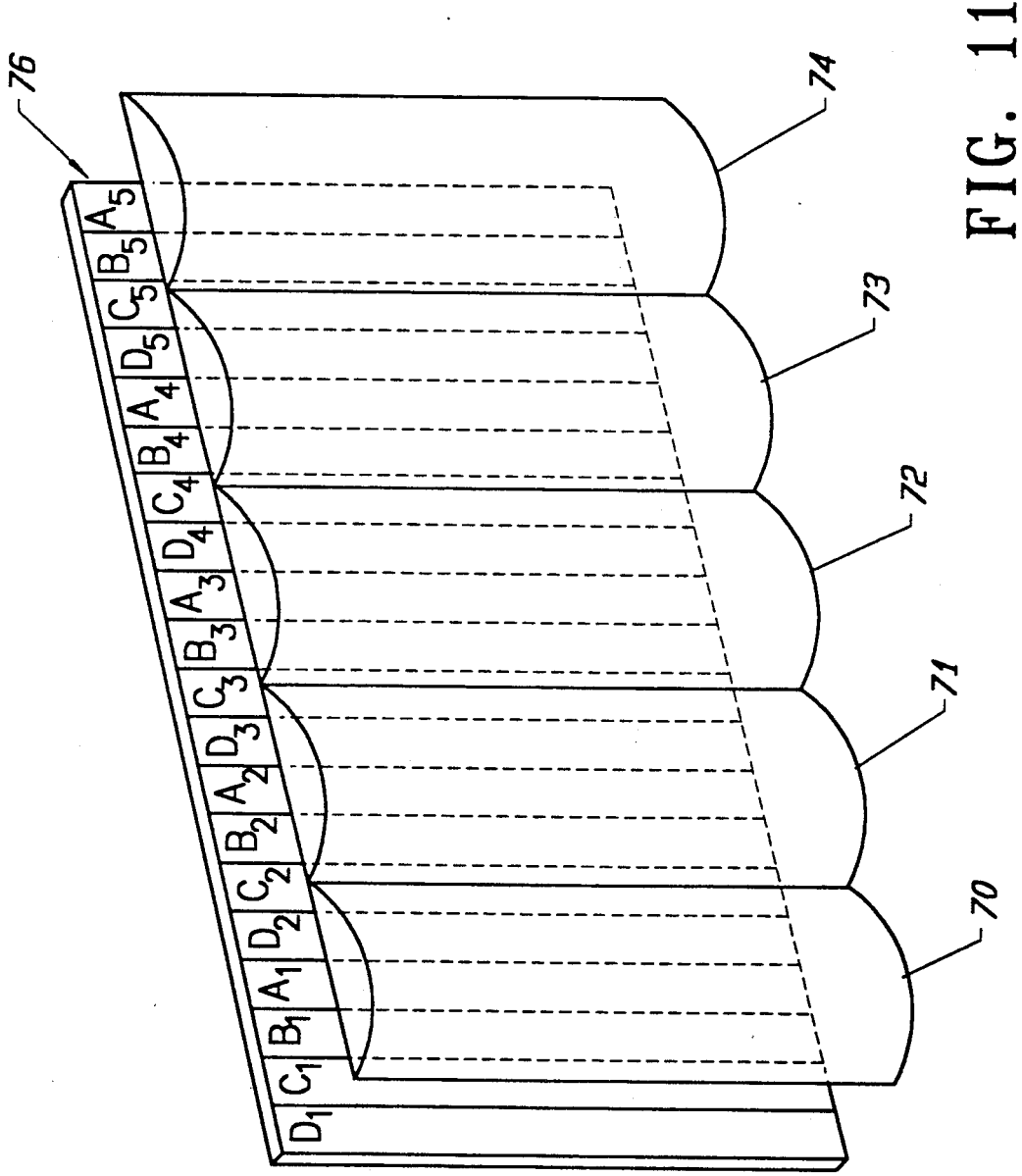
FIG. 11 is a closeup view of the picture elements and lenticules of an interdigitated parallax video stereogram.

FIG. 10 is a stereoscopic video camera of the same general type described above, but designed for the production of interdigitated parallax stereograms of the type offered by Nimslo and others. To produce this kind of display, the FIG. 10 camera includes lenses A, B, C, and D, and sensors E, F, G, and H. Each one of the lenses receives a different perspective view, having a relationship to the other lenses in that it is horizontally shifted by some distance. The images received at the sensors are interdigitated or sliced into vertical columns, and a set of such columns is intimately juxtaposed behind its own lenticule of a display screen as shown in FIG. 11.

This art is in general, well known, and the lenticules are of a type that are in the form of columns of cylinders which resemble corduroy in configuration. In accordance with the invention, each of sensors E, F, G, and H is translatably mounted within housing Z for horizontal motion (in the direction of the arrows shown in FIG. 10). FIG. 11 shows an arrangement of image strips 76 and lenticules 70–74 which are produced using the camera shown in FIG. 10. In FIG. 11, there are four image strips 76 behind each lenticule. The unique subscript for each set of four image strips indicates that the image information is different for each lenticule. It will be obvious to those skilled in the art that the means for producing ZPS for a field sequential planostereoscopic display, described herein, can also be applied to an interdigitated lenticular display. The means for interdigitating the images produced by sensors E, F, G, and H is beyond the scope of this disclosure, as is a description of the type of display screen employed to form the columns of images which are juxtaposed with the lenticules. Moreover, this disclosure is not limited to the case that the camera has four lenses, as shown in FIG. 10 and implied in FIG. 11. Rather, and any number of lenses (and corresponding sensors) may be used, providing the number of lenses and sensors employed is two or greater.

Lipton, in U.S. Pat. No. 4,418,993, describes the problems associated with zoom lenses as applied to the creation of stereoscopic images. The principal problems have to do with recentration of optics with changes of focal length, as mentioned in the aforementioned patent, as recentration may occur with changes in focus. As zoom lenses are zoomed, the optical center of the zoom lens tends to wander away from the center of the image field. Such wandering is of little concern for normal videography, but for stereoscopic videography the comparative wanderings of two image centers will produce unwanted parallax in both the vertical and horizontal directions.

Figure 7:
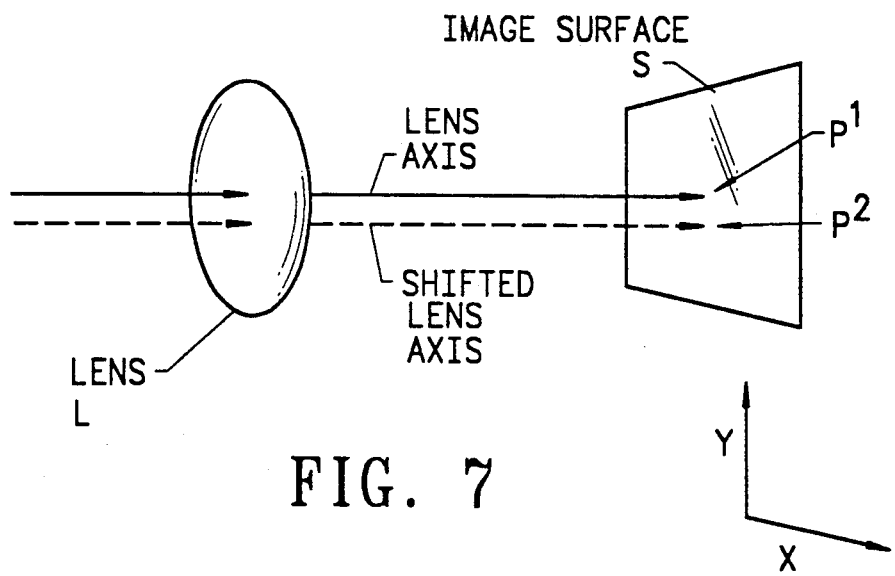
FIG. 7 is a representation of the optical center of a zoom lens, showing how it may move during zooming, with respect to a fixed image center.

FIG. 7 shows what happens to the original lens axis of lens L, as the focal length of the lens changes. Initially the lens axis intersects the imaging surface S of the sensor, which lies in a plane perpendicular to the lens axis, at point $P^1$. With a change in focal length the lens axis moves to that shown by the dotted line, which intersects the plane of the image surface at point $P^2$, some distance from $P^1$. It is possible to chart the XY coordinates of the change in location of the intersection of the lens axis with the imaging surface as a function of focal length, and to store that information by any one of a variety of means. A sensor located on the lens mount is needed to detect the position of the mount with reference to the changes in focal length so that it may be referenced to the experimentally determined value of location of the intersection of the moving axis with the image plane. Means for this, using mechanical correction methods, have been given in the aforementioned U.S. Pat. No. 4,418,993.

Figure 8:
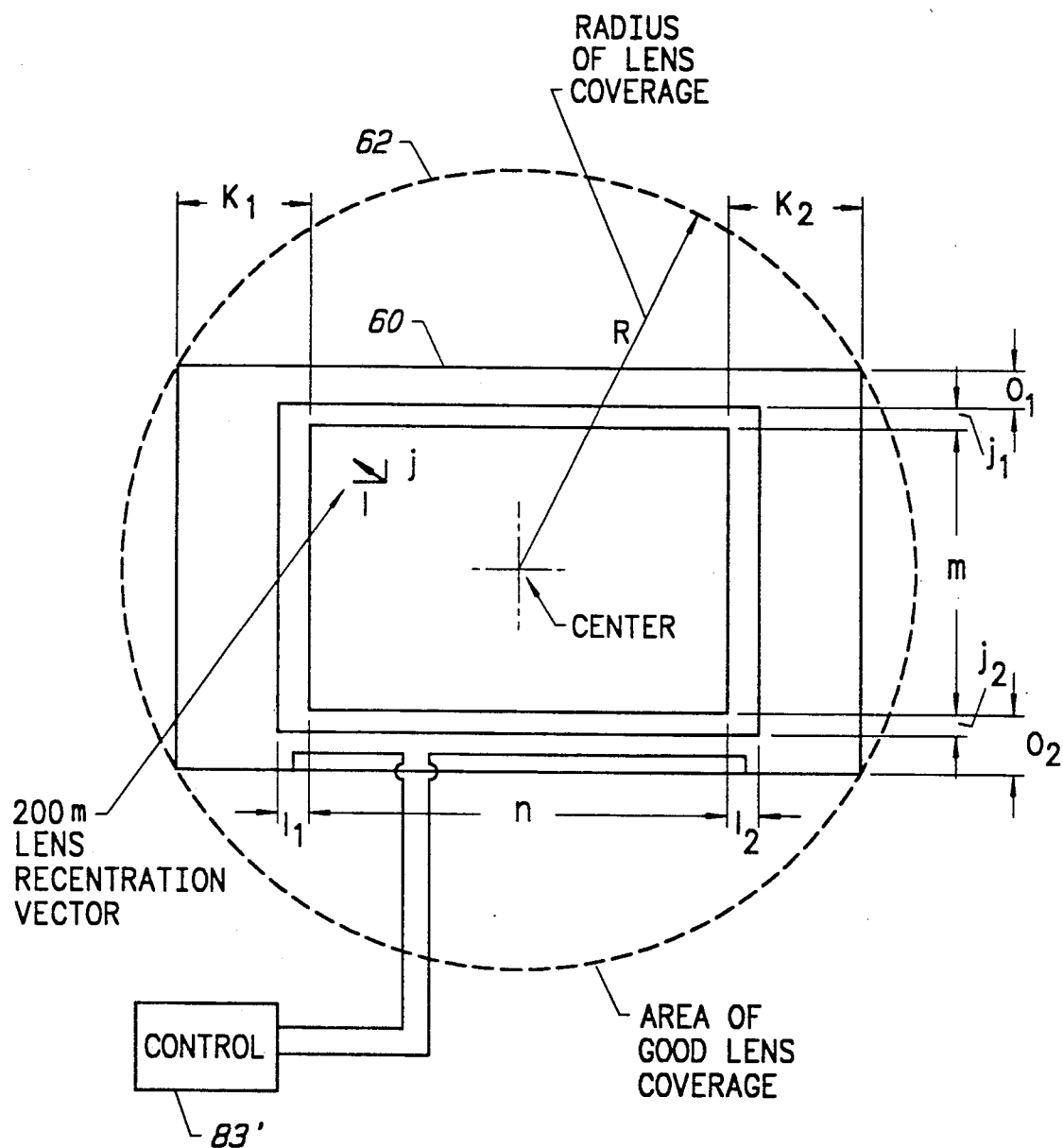
FIG. 8 is a diagrammatic representation of a solid state sensor with variably addressed columns and rows to maintain with aspect ratio of the image while effectively shifting the image center to track for changes in the recentration of zoom lens optics while such lenses change focal length.

Here, however, we are concerned with means similar to that given above with regard to movement of the imaging surface for ZPS control. Shown in FIG. 8 is image surface 60 with dimensions $n + k_1 + k_2 \times m + O_1 + O_2$, which contains image area nm, with center as shown. As zoom lens 62 changes focal length away from the value that places its axis at a point which intersects the center of nm, the location of the intersection with changing focal length may be kept in the middle of the active image field horizontally and vertically by means of scanning appropriate column and rows of pixels forming the active image area of the sensor surface.

In FIG. 8 the arrow pointing to the upper left from the center, shows as an example the direction of a recentration vector associated with a change in focal length. On the imaging surface the result is a shift in the horizontal component by a shift to the left by distance 1 and to the top by distance j. If a vertical column equal to width 1 is turned off (by control circuit 83'), within the right edge of the active image surface area nm, and an area equal to it in width is turned on at the left edge (by control circuit 83'), then the center of the active imaging area is shifted in the horizontal to make up for the centration vector shift by distance 1. Similarly, the active image may be raised by height j by following a similar procedure in the vertical direction. The effect of this is to move the active image area to follow the change in centration.

The information concerning the calibration of the lens with respect to the shift in centration may be stored in ROM, or some other convenient storage medium for interpretation by the electronic circuit responsible for moving the relative image center as described above. By tracking the centration change as a function of focal length for either or both the left and right zoom lenses, it is possible to produce an effective zero relative change in centration between the two image fields. This means will eliminate the production of spurious parallax which would otherwise make the resultant stereoscopic image difficult to view.

It is also possible to physically move the image sensors to track the changes in centration of the lenses as they zoom. Such means have been described above in the context of setting the ZPS, with the aid of FIG. 5d. In this case, rather than switching on and off appropriate sets of rows and columns of pixels, the stored recentration information is used to operate an electromechanical means of shifting the image sensors by the appropriate amounts in the vertical and horizontal directions.

The technique of switching on and off various rows and columns of pixels described above, illustrated with the aid of FIG. 8, may also be exploited to control the relative magnification of the images produced by the left and right zoom lenses. It is possible to calibrate the lenses so that information about their focal lengths is stored in memory with reference to the mechanical position of the zoom elements of the lens. Given the availability of such information, the size of the image sensor available for actively forming the image can be altered to compensate for mismatched lens magnification. If the lenses do not produce images with the same magnification, the resulting stereoscopic image will be difficult for the viewer to fuse.

Figure 9A:
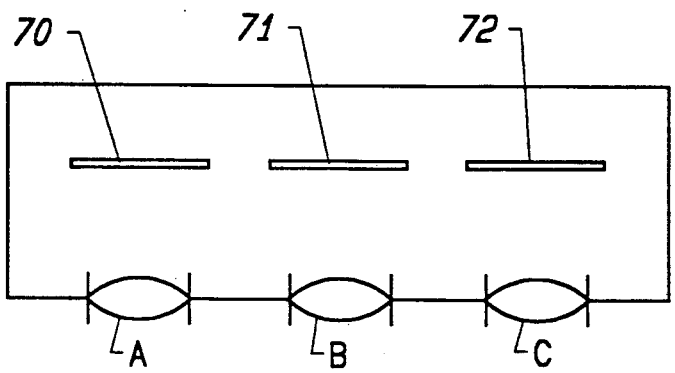
FIGS. 9a and 9b, are diagrams of integral electrostereoscopic video cameras using multiple or moving lenses in order to provide for changes in the strength of the stereoscopic effect by using different pairs of lenses with different inter-axial separations.

FIG. 9a is a camera which uses three heads made up of three sets of lenses A, B, and C, and their associated (translatably mounted) image sensors 70, 71, and 72, only two sets of which are employed at a time to produce stereopairs as taught herein. Lenses A and C are further apart than combinations B and C, or A and B, and A and C are used for objects which are more than a few feet from the camera. When objects are close to the camera, only a few feet or less away, then either A and B or B and C are used to reduce the inter-axial separation of the perspective view. It is well known in the art of stereoscopy that closeups require a reduced inter-axial separation for the images to have the proper stereoscopic effect and also in order to reduce the values of parallax so that the image may be comfortable to view. If the distance between A and B is different from the distance between B and C then there is the additional ability to select three different inter-axial distance so that settings for far, medium, and close objects may be provided. It should be understood that all of the techniques taught herein, for ZPS and recentration control are applicable to this arrangement of lenses and image sensors.

Figure 9B:
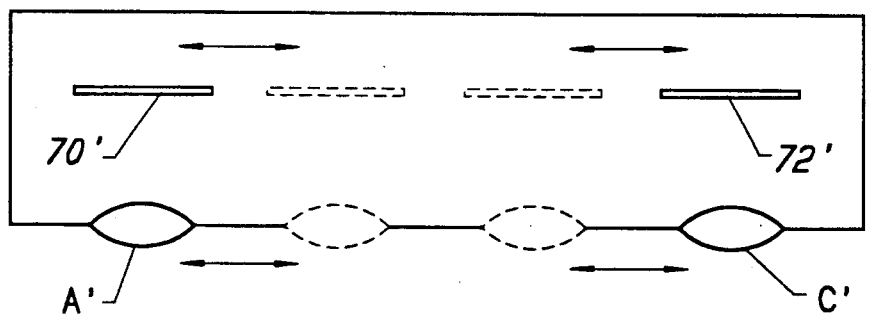

A moving image video camera may require a continuous change in inter-axial separation during a shot, and for this purpose the camera shown in FIG. 9b may be a more suitable arrangement. Here translatably mounted lenses A' and C' may be horizontally shifted continuously as the distance to the subject changes or as the lenses are zoomed. It will be understood that each image sensor 70' and 72' moves along with the moving lens and shifts in the horizontal direction along with the lens. Close objects require a reduced distance for the inter-axial setting, as does the use of shorter focal lengths. Conversely, longer focal lengths and greater object distances require a greater inter-axial separation. It should be understood that the art taught herein with regard to control of ZPS and recentration of zoom optics may be applied to this camera design.

Electronic stereoscopic still or moving image cameras output a video signal which can be viewed on a display screen. A flickerless image is desirable, and requires fields to be written as twice the usual vertical frequency employed for planar displays, as described in U.S. Pat. Nos. 4,562,463 and 4,523,226. We identify here three formats for playing back a stereoscopic image as shown in FIGS. 4a, 4b, and 4c. FIG. 4a uses a technique of four-fold interlace described by Lipton and Meyer (SID Digest, 1984, pp. 124–127). A stereoscopic frame or picture in this case is made up of four fields. Each eye will see either left or right fields and each eye will see a two-fold interlace. We see that the first field in the series of four fields making up one complete stereoscopic frame or picture, begins with the first line starting to write the image in the upper left have corner of the field. This is the left odd field. The next field, the right odd field, begins a quarter of a line inward from the left corner, and the left even field begins writing half a line inward from the left corner. The final field of the set of fields making up the frame begins its first line writing three quarters of the way in from the left corner where the first line was written. This last field is the right even field.

An alternative to four-fold interlace is FIG. 4b which uses a dual two-fold interlace scheme in which each eye sees a two-fold interlace as a result of having seen alternative fields of two sets of two-fold interlaced fields. The first field making up a stereoscopic frame begin their scanning with lines starting at the extreme upper left corner of the field. They are the left odd and right odd fields. The next two fields are written with the first line in each starting half way in from the first line. They are the left even and right even fields.

Please note that the order of the fields in the descriptions above might just as well have been right, left, right, left, rather than left, right, left, right.

In the above two schemes for presenting a complete stereoscopic picture interlace was used and it is required to write four fields. The scheme given in FIG. 4c on the other hand, employs progressive or non-interlace scan to produce only two fields containing between them the complete image information of a stereopair of images. The left and right fields are each written with lines starting at the extreme upper left portion of the field. Persons familiar with the art will understand that there are possible variations to this scheme, but such variations are obvious in view of the basic ideas explained herein.

A class of preferred embodiments of the invention will next be described with reference to FIGS. 12–15.

Figure 12:
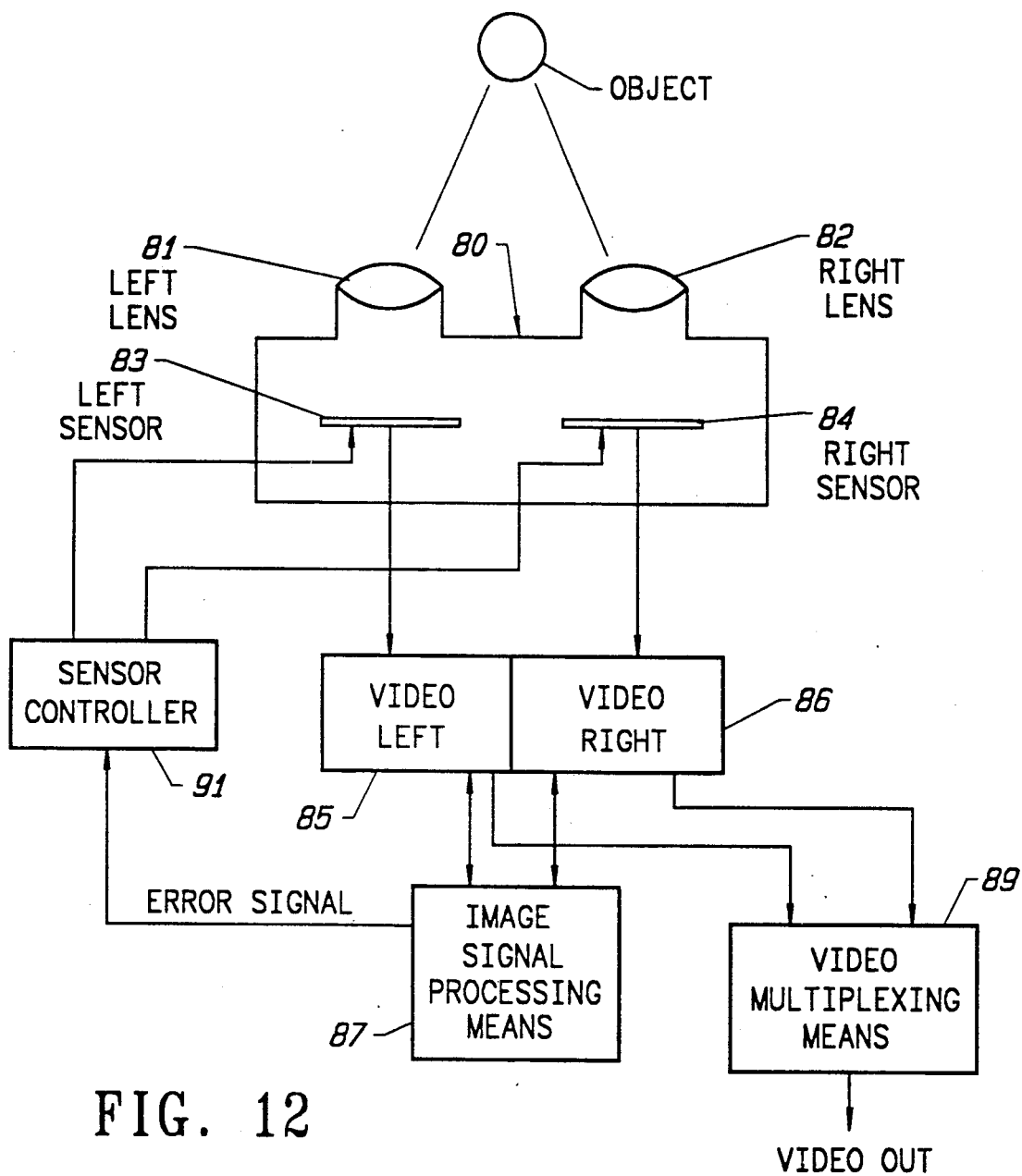
FIG. 12 is a schematic block diagram of a preferred embodiment of the invention.

In the system of FIG. 12, stereoscopic video camera 80 includes left lens 81 and right lens 82, both of which are fixedly mounted in the camera housing. Camera 80 also includes left image sensor 83 and right image sensor 84, both of which have variable effective position in relation to lenses 81 and 82. Sensor control circuit 91 generates control signals, for controlling the effective position of sensors 83 and 84, in response to error signals from signal processing means 87. Each of sensors 83 and 84 preferably includes an image surface of the same type as image surface 60 described with reference to FIG. 8. To generate a stereoscopic image of an object, such as that shown in FIG. 8, selected rows and columns of sensor 83 are read by left video signal generation circuit 85, and selected rows and columns of sensor 84 are read by right video signal generation circuit 86. Alternatively, sensors 83 and 84 be implemented using tube technology.

The left and right video signals asserted at the outputs of circuit 85 and circuit 86, respectively, are combined in video multiplexing means 89 for subsequent recording or display (such as display on monitor 90 of FIGS. 13–15) as a field-sequential stereoscopic video signal. The output of multiplexing means 89 can be displayed on monitor 90 as either a moving image or a still image.

Signal processing means 87 (which can include a programmed microcomputer) receives the video signals output from circuits 85 and 86, and processes them in a manner to be described below, to generate control signals for varying the effective position of sensors 83 and 84. The control signals, which are supplied from processing means 87 to circuits 85 and 86, accomplish this result by controlling which rows and columns of sensors 83 and 84 are read by circuits 85 and 86.

As mentioned above, signal processing means 87 can also generate error signals and supply these signals to sensor control circuit 91. The manner in which means 87 generates the error signals will be explained below. In response to the error signals, circuit 91 will generate control signals for varying the physical position of one or both of sensors 83 and 84.

Thus, the effective position of sensors 83 and 84 can be controlled in two ways: by supplying control signals from means 87 to circuits 85 and 86 to control which rows and columns of sensors 83 and 84 are read by circuits 85 and 86; or by supplying error signals from means 87 to circuit 91 to cause circuit 91 to vary the actual physical position of sensors 83 and 84. The inventive apparatus need not include means for implementing both these types of feedback control. In alternative embodiment, feedback from means 87 to circuit 91 can be omitted, or feedback from means 87 to circuits 85 and 86 can be omitted.

Figures 13, 14, 15:
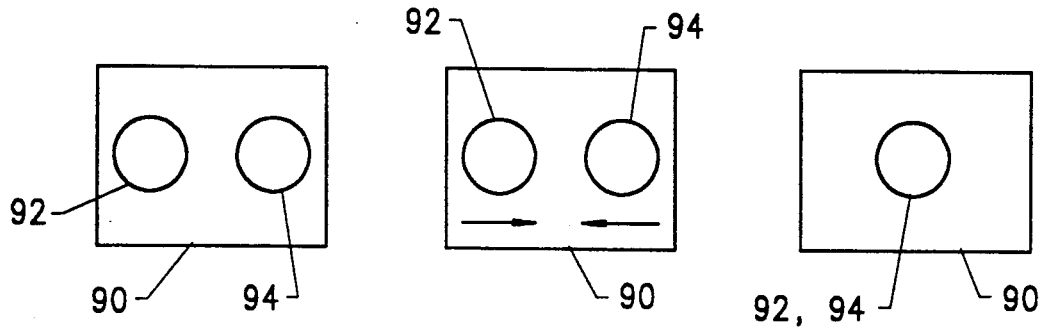
FIG. 14 indicates the direction in which the inventive system would move the effective positions of the left and right images to achieve a zero parallax setting.
FIG. 15 is a diagram representing superimposed, left and right stereoscopic video camera images as they would appear displayed on a monitor after the effective positions of corresponding left and right sensors have been controlled in accordance with the invention to achieve a zero parallax setting.

For the purposes of exposition, it is helpful to imagine that the object to be imaged is a black ball on a white, featureless background. In this case, video signals from circuits 85 and 86 (representing the outputs of sensors 83 and 84) would have the appearance shown in FIG. 13, when they are displayed in rapid succession on monitor 90. As is well known, if the two video field signals are displayed in sufficiently rapid succession on monitor 90, the persistence of vision of a human viewer would result in the two images appearing to be displayed simultaneously on monitor 90. In FIG. 13, left video camera image 92 represents the output of sensor 83, and right video camera image 92 represents the output of sensor 84. The display of FIG. 13 may result from a default position for sensors 83 and 84 in which each the geometric center of each sensor is aligned along the central axis of the corresponding fixed lens.

In accordance with the invention, processing means 87 implements a signal processing technique (such as edge detection or feature matching) to locate the position of left image 92 within the left image field and the position of right image 94 within the right image field. This is accomplished as follows. Circuit 85 generates a first video field signal by reading out sensor 83, and circuit 86 generates a second video field signal by reading out sensor 84. Processing means 87 receives the field signals, determines a horizontal (and/or vertical) pixel index corresponding to left image 92 within the first video field signal, and determines a horizontal (and/or vertical) pixel index corresponding to right image 94 within the second video field signal.

After locating the left and right images, processing means 87 generates appropriate control signals whose value depends on the distance between the left and right images for causing circuits 85 and 86 to shift the effective position of one or both of sensors 83 and 84 (and/or signals of the type referred to above as "error signals" whose value depends on the distance between the left and right images for causing circuit 91 to shift the effective position of one or both of sensors 83 and 84) horizontally (leftward or rightward in FIG. 12) and vertically (into or out of the plane of FIG. 12). By shifting the effective position of sensor 83 or 84 horizontally or vertically, the convergence of camera 80 can be controlled. By shifting the effective position of sensor 83 or 84 horizontally, the zero parallax setting of camera 80 can be controlled. By shifting the effective position of sensor 83 or 84 vertically, recentration of the type which may occur during camera zooming or focusing can be controlled.

FIG. 14 indicates the direction in which the inventive system would move the effective positions of left and right images 92 and 94 on monitor 90 to achieve a zero parallax setting. Such horizontal image "motion" is accomplished by a closed loop servo process in which processing means 87 sends control signals to circuits 85 and 86 to vary the columns (as opposed to rows) of sensors 83 and 84 that are read by circuits 85 and 86 (to cause circuit 85 to read additional columns of sensor 83 at sensor's left edge and fewer columns of sensor 83 at the sensor's right edge, and to cause circuit 86 to read additional columns of sensor 83 at sensor's right edge and fewer columns of sensor 83 at the sensor's left edge). Then, sensors 85 and 86 are again read to produce a pair of left and right video field signals, and processing means 87 uses these field signals as feedback to generate a next set of control signals for moving the effective horizontal location of the left and right images within the left and right field signals to achieve the desired relative horizontal location.

FIG. 15 is a diagram representing superimposed, left and right images 92 and 94 as they would appear displayed on monitor 90 after the effective positions of corresponding left and right sensors have been controlled in accordance with the invention to achieve a zero parallax setting.

The invention thus provides a means to automatically adjust a stereoscopic image to create an optimized display, i.e., one which is easy to look at without strain or discomfort. Translating each field is equivalent to translating the left and right object images so they will be, in effect, spatially superimposed when sequentially displayed. The amount of horizontal and vertical translation can be communicated from processing means 87 to sensors 83 and 84 by means of any of the schemes discussed above, such as by controlling electro-mechanical actuators to vary the actual position of the sensor, or (preferably) by selectively enabling rows and columns of sensor pixels.

It is important to be able to control the effective horizontal sensor translation to maintain ZPS, or to track the motion of a moving object and to continuously retranslate the left and right fields, so the object appears in the plane of the display screen, for compositional purposes. Another reason to do this tracking of the object's location is to eliminate centration errors in both the horizontal and vertical directions produced by the camera optics, as previously discussed. By practicing the invention, these centration errors (which may vary continuously) can be tracked and corrected continuously so that they become effectively impossible to perceive.

A major virtue of the inventive technique is that it eliminates the need to measure and calibrate the lenses in terms of centration as a function of focal length or similar changes of centration which may occur during focusing. It will remain important to match the coordination of focal length of both lenses, which may be easily accomplished with a single control. However, the inventive approach to "on the fly" centration correction through signal processing provides enormous advantages in camera manufacture and after the finished camera is in the hands of the user. It is well known that optical systems and their instrumentation may lose tolerance through wear and tear. The inventive technique of signal processing and control of centration through effective translation of left and right sensors, is an inherently self correcting closed loop servo technique.

It will be apparent to those of ordinary skill in the art that complex objects can be located in relation to complex backgrounds by implementing appropriate signal processing techniques in processing means 87. For example, processing means 87 can be programmed to have a default mode in which it tracks whatever "object" is imaged in the dead center of the right or left image field. Alternatively, the user can employ any of several well-known techniques to command processing means 87 to track any designated "object" that is imaged in any portion of the left or right image field.

Such designation of the selected object can be accomplished using an interactive video screen having an electronic touch sensor means. In this case, the videographer can indicate the object to be tracked by pointing to it with a finger or a with special pointing instrument. Alternatively, mouse or keyboard control could be employed.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A stereoscopic video camera, including:
   a housing;
   a left lens having a first optical axis and a right lens having a second optical axis, wherein the left lens and the right lens are fixedly mounted in the housing with the first optical axis substantially parallel to the second optical axis;
   a left image sensor mounted in the housing along the first optical axis and a right image sensor mounted in the housing along the second optical axis;
   a means for generating a left video signal by reading out the left image sensor and for generating a right video signal by reading out the right image sensor;
   a signal processing means for generating image location signals from the left video signal and the right video signal, wherein the image location signals are indicative of the location of an image within the left video signal and the right video signal; and
   a sensor position control means for controlling the effective position of at least a first one of the left image sensor and the right image sensor relative to the housing in response to the image location signals.

2. The camera of claim 1, wherein the signal processing means includes a means for generating a sensor control signal from the image location signals, and wherein the sensor position control means includes means for controlling the effective position of at least a first one of the left image sensor and the right image sensor by applying the sensor control signal to said first one of the left image sensor and the right image sensor.

3. The camera of claim 1, wherein the left image sensor and the right image sensor are solid state mosaic devices having pixel rows and columns, and wherein the sensor position control means includes a control circuit for activating selected ones of the pixel rows and columns in response to the sensor control signal.

4. The camera of claim 3, wherein each of the solid state mosaic devices is a charge coupled device.

5. The camera of claim 1, wherein the left image sensor and the right image sensor are tube devices.

6. The camera of claim 1, wherein the sensor position control means includes:
   a means for translating the left image sensor and/or the right image sensor linearly in a plane substantially perpendicular to the first optical axis.

7. The camera of claim 1, also including:
   a third lens having a third optical axis, wherein the third lens is mounted in the housing with the third optical axis substantially parallel to the second optical axis;
   a third image sensor mounted in the housing along the third optical axis; and
   wherein the sensor position control means includes means for selectively exposing the left image sensor to different portions of a first image focused thereon by the left lens, for selectively exposing the right image sensor to different portions of a second image focused thereon by the right lens, and for selectively exposing the third image sensor to different portions of a third image focused thereon by the third lens, in response to the sensor control signal.

8. The camera of claim 1, wherein the sensor position control means includes a means for shifting the effective position of the first one of the left image sensor and the right image sensor to control convergence of the camera in response to the sensor control signal.

9. The camera of claim 1, wherein the sensor position control means includes a means for shifting the effective position of the first one of the left image sensor and the right image sensor to control zero parallax setting of the camera in response to the sensor control signal.

10. The camera of claim 1, wherein the sensor position control means includes a means for shifting the effective position of the first one of the left image sensor and the right image sensor to control camera recentration in response to the sensor control signal.

11. A method for operating a stereoscopic video camera having a housing, a left lens fixedly mounted in the housing and having a first optical axis, a right lens fixedly mounted in the housing and having a second optical axis, a left image sensor mounted in the housing along the first optical axis, and a right image sensor mounted in the housing along the second optical axis, including the steps of:
   (a) generating a left video signal by reading out the left image sensor and generating a right video signal by reading out the right image sensor;
   (b) generating image location signals from the left video signal and the right video signal, wherein the image location signals are indicative of the location of an image in the left video signal and the right video signal;
   (c) generating a sensor control signal from the image location signals; and
   (d) controlling the effective position of at least a first one of the left image sensor and the right image sensor relative to the housing by applying the sensor control signal to said first one of the left image sensor and the right image sensor control circuit.

12. The method of claim 11, wherein the left video signal is a left video field signal and the right video signal is a right video field signal.

13. The method of claim 11, wherein each of the image location signals comprises a horizontal pixel index and a vertical pixel index which identify the location of said image.

14. The method of claim 11, wherein the left image sensor and the right image sensor are solid state mosaic devices having pixel rows and columns, and wherein step (d) includes the step of activating selected ones of the pixel rows and columns in response to the sensor control signal.

15. The method of claim 11, wherein step (d) includes the step of translating the left image sensor and the right image sensor linearly in a plane substantially perpendicular to the first optical axis.

16. The method of claim 11, wherein the camera also includes a third lens having a third optical axis, wherein the third lens is mounted in the housing with the third optical axis substantially parallel to the second optical axis, and a third image sensor mounted in the housing along the third optical axis, and wherein step (d) includes the steps of:

selectively exposing the left image sensor to different portions of a first image focused thereon by the left lens in response to the sensor control signal;

selectively exposing the right image sensor to different portions of a second image focused thereon by the right lens in response to the sensor control signal; and selectively exposing the third image sensor to different portions of a third image focused thereon by the third lens in response to the sensor control signal.

17. The method of claim 11, wherein step (d) includes the step of shifting the effective position of the first one of the left image sensor and the right image sensor to control convergence of the camera.

18. The method of claim 11, wherein step (d) includes the step of shifting the effective position the first one of the left image sensor and the right image sensor to control zero parallax setting of the camera.

19. The method of claim 11, wherein step (d) includes the step of shifting the effective position the first one of the left image sensor and the right image sensor to control camera recentration.

* * * * *

UNITED STATES PATENT AND TRADEMARK OFFICE
CERTIFICATE OF CORRECTION

PATENT NO. : 5,142,357                      Page 1 of 4

DATED : August 25, 1992

INVENTOR(S) : LENNY LIPTON and LAWRENCE D. MEYER

It is certified that error appears in the above - identified patent and that said Letters Patent is hereby corrected as shown below:

On the title page, in right column, line 12, the word "Foundatoins" should read --Foundations--.

In column 2, line 39, "$A^1C^1$" should read --A'C'--.

In column 2, line 40, "$B^1D^1$" should read --B'D'--.

In Col. 2, line 50, "lenses and sensors," should read --lenses, and sensors--.

In Col. 2, line 56, "Systems" should read --System--.

In Col. 4, line 24, "with" should read --the--.

In Col. 4, line 28, "9b," should read --9b--.

In Col. 4, line 63, ""1"" should read --I--.

In Col. 5, line 6, "University" should read --University of--.

In Col. 5, line 8, "axis" should read --axes--.

In Col. 5, line 30, "$A^1$" should read --A'--.

In Col. 5, line 31, "B and $B^1$" should read --B and B'--.

In Col. 8, line 13, "swing" should read --swings--.

UNITED STATES PATENT AND TRADEMARK OFFICE
CERTIFICATE OF CORRECTION

PATENT NO. : 5,142,357

DATED : August 25, 1992

INVENTOR(S) : LENNY LIPTON and LAWRENCE D. MEYER

It is certified that error appears in the above - identified patent and that said Letters Patent is hereby corrected as shown below:

In Col. 8, line 31, "$1_1m$ should read --$I_1m$--.

In Col. 8, line 31, "$1_2m$ should read --$I_2m$--. (both occurrences)

In Col. 8, line 32, "$1_1m$" should read --$I_1m$--.

In Col. 8, line 34, "$1_1m$" should read --$I_1m$--. (both occurrences)

In Col. 8, line 34, "$1_2m$" should read --$I_2m$--.

In Col. 8, line 35, "$1_2m$" should read --$I_2m$--.

In Col. 8, line 38, "axis" should read --axes--.

In Col. 9, line 38, delete the word "and" between "Rather," and "any".

In Col. 10, line 16, "column" should read --columns--.

In Col. 10, line 23, "1" should read --l--.

In Col. 10, line 25, "1" should read --l--.

In Col. 10, line 30, "1" should read --l--.

In Col. 11, line 20, "distance" should read --distances--.

In Col. 11, line 57, "have" should read --hand--.

In Col. 12, line 2, "field" should read --fields--.

In Col. 12, line 41, "can" should be inserted between "84" and "be".

UNITED STATES PATENT AND TRADEMARK OFFICE
CERTIFICATE OF CORRECTION

PATENT NO. : 5,142,357

DATED : August 25, 1992

INVENTOR(S) : LENNY LIPTON and LAWRENCE D. MEYER

It is certified that error appears in the above - identified patent and that said Letters Patent is hereby corrected as shown below:

In Col. 13, line 6, "an" should be inserted between "In" and "alternative".

In Col. 13, line 22, "92" should read --94--.

In Col. 13, line 24, delete the word "the".

In Col. 14, line 1, "the" should be inserted between "at" and "sensor's".

In Col. 14, line 3, "83" should read --84--.

In Col. 14, line 4, "83" should read --84--.

In Col. 14, line 5, "85" should read --83--.

In Col. 14, line 5, "86" should read --84--.

In Col. 18, line 10, "of" should be inserted between "position" and "the".

UNITED STATES PATENT AND TRADEMARK OFFICE
CERTIFICATE OF CORRECTION

PATENT NO. : 5,142,357

DATED : August 25, 1992

INVENTOR(S) : LENNY LIPTON AND LAWRENCE D. MEYER

It is certified that error appears in the above-indentified patent and that said Letters Patent is hereby corrected as shown below:

In Col. 18, line 14, "of" should be inserted between "position" and "the".

Signed and Sealed this

Fourth Day of January, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,142,357

DATED : August 25, 1992

INVENTOR(S): Lenny Lipton and Lawrence D. Meyer

It is certified that error appears in the above - identified patent and that said Letters Patent is hereby corrected as shown below:

On title page, Item [73] Assignee
name should be -- StereoGraphics Corp. --.

Signed and Sealed this

Twelfth Day of April, 1994

Attest:

BRUCE LEHMAN

Attesting Officer

Commissioner of Patents and Trademarks